US011194027B1

(12) United States Patent
Subasingha et al.

(10) Patent No.: US 11,194,027 B1
(45) Date of Patent: Dec. 7, 2021

(54) REDUCING NOISE IN SENSOR DATA

(71) Applicant: Zoox, Inc., Foster City, CA (US)

(72) Inventors: Subasingha Shaminda Subasingha, Weston, FL (US); Turhan Karadeniz, Oakland, CA (US); Robert Nicholas Moor, San Mateo, CA (US); Mehran Ferdowsi, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 174 days.

(21) Appl. No.: 16/550,153

(22) Filed: Aug. 23, 2019

(51) Int. Cl.
   *G01S 7/493* (2006.01)
(52) U.S. Cl.
   CPC .................................. *G01S 7/493* (2013.01)
(58) Field of Classification Search
   CPC ....................................................... G01S 7/493
   USPC ....................................................... 702/159
   See application file for complete search history.

(56) References Cited

U.S. PATENT DOCUMENTS

| | | | | |
|---|---|---|---|---|
| 8,983,233 | B2 * | 3/2015 | Katz | G01S 17/894 |
| | | | | 382/286 |
| 10,382,736 | B1 * | 8/2019 | Thurner | G01S 7/4914 |
| 10,777,589 | B2 * | 9/2020 | Sadhu | G01S 17/894 |
| 10,830,894 | B2 * | 11/2020 | Karadeniz | G01S 17/931 |
| 2016/0205378 | A1 * | 7/2016 | Nevet | H04N 5/36961 |
| | | | | 348/47 |

* cited by examiner

*Primary Examiner* — Aditya S Bhat
(74) *Attorney, Agent, or Firm* — Lee & Hayes, P.C.

(57) ABSTRACT

Sensors, including time-of-flight sensors, may be used to detect objects in an environment. In an example, a vehicle may include a time-of-flight sensor that images objects around the vehicle, e.g., so the vehicle can navigate relative to the objects. Sensor data generated by the time-of-flight sensor can include noise. In some examples, the sensor data is filtered by comparing a measured intensity value to a threshold intensity value. The threshold intensity value can be determined on a per-pixel basis using depth information and/or intensity information for a corresponding image frame.

20 Claims, 5 Drawing Sheets

REDUCING NOISE IN SENSOR DATA

BACKGROUND

Some sensors, such as time-of-flight sensors, may be unreliable in certain environments, including environments with varied lighting and/or environments containing objects with different reflective and absorptive properties. For instance, stray light resulting from ambient light, reflection off certain objects, and/or sensor characteristics can result in pixel noise. Pixel noise is less reliable and may result in increased processing time to better understand the data and/or decreased efficiency in identifying and/or characterizing objects in the data. When such sensors are intended for use on an autonomous vehicle, noise can be a hindrance to identifying and/or characterizing potential obstacles to travel, thereby reducing safety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes methods, apparatuses, and systems for removing noise from sensor data used to identify objects in an environment and to control a vehicle relative to those identified objects. For example, an autonomous vehicle can include a plurality of sensors to capture sensor data corresponding to an environment of the vehicle. The sensor data can include data associated with the environment, which, in some instances, can include multiple objects (e.g., pedestrians, vehicles, bicyclists, etc.). Oftentimes, different sensor modalities are used for redundancy purposes and/or because of inherent shortcomings in the sensors. For example, time-of-flight sensors, relative to other sensor types, may generate sensor data more quickly and/or may be more reliable at shorter ranges. As a result of these characteristics, some vehicle implementations may use time-of-flight sensors in safety critical applications, e.g., to recognize objects in close proximity to the vehicle and/or to avoid imminent collisions. However, in some instances intensity and distance information generated by time-of-flight sensors may be unreliable due to one or more of oversaturation, glare caused by highly reflective objects, pixel noise from stray light, under exposure, ambiguous returns, or the like. Techniques described herein can be used to improve sensor data, including time-of-flight sensor returns. For example, in implementations described herein, pixel filtering techniques may be used to remove "noisy" pixels from measured data. Such techniques may, in some instances, result in a better understanding of the environment of the vehicle, thereby leading to safer navigation and/or more confident controlling of the vehicle.

As discussed herein, sensor data can be captured by one or more sensors, which can include time-of-flight sensors, RADAR sensors, LiDAR sensors, SONAR sensors, image sensors, microphones, or any combination thereof. The sensor can include an emitter to emit a signal and a sensor to sense a return signal from the environment. In the context of a time-of-flight sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can include an intensity image and a depth image having, respectively, per-pixel intensity and depth values. In some implementations, the sensor computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

In implementations described herein, a sensor, a sensor computing device, and/or another computing system in communication with the sensor can filter generated sensor data to remove noisy pixels, thereby providing a smaller dataset and/or a more reliable dataset. As described above, pixel noise can result from any of a number of factors, including but not limited to stray light caused by reflections, sunlight, and glare. In some instances, identifying objects in noisy image data may be difficult, so filtering noise can provide improved safety outcomes, for example.

In some examples, systems and techniques described herein for filtering sensor data can include glare can include receiving image data from a sensor, such as a time-of-flight sensor. For example, the time-of-flight sensor may generate image data including intensity information and depth information. The intensity information may include an intensity image that associates measured intensity values with pixels in the image. The depth information may include a depth image that associates measured depths (e.g., distances from the sensor) with the pixels in the image.

In some implementations, pixels in the image data may be filtered by comparing the measured intensity to a threshold intensity. In examples, if a measured intensity of a pixel is below a threshold intensity for that pixel, the pixel is rejected. Alternatively, pixels that have a measured intensity value equal to or above the threshold intensity value can be retained.

In some examples, techniques described herein can determine the intensity thresholds on a pixel-by-pixel basis. For example, the threshold intensity for a pixel may be based on information from the depth image and/or information from the intensity image, including depth and/or intensity information about the pixel. In some examples, the threshold intensity for a pixel may be inversely proportional to a measured depth of the pixel, e.g., because relatively closer objects may produce more noise. Also in examples, the threshold intensity for a pixel may be directly proportional to a depth variance of an area including the pixel. The depth variance can be determined from the depth image. In still further examples, the threshold intensity for a pixel may be directly proportional to an average intensity for a region of the image data including the pixel. For instance, relatively higher intensity areas may have relatively higher intensity noise and relatively lower intensity areas may have relatively lower intensity noise. In some examples, thresholding based on the average intensity can better identify relatively darker objects and/or objects in relatively darker areas.

In examples, the filtered data can be generated based on a pixel-by-pixel comparison of the measured intensity values to the determined threshold values. The filtered data may include pixels that are associated with objects in the dynamic range of the sensor, while excluding other pixels, including pixels associated with background objects. The filtered data can provide a cleaner data set, because noise has been largely removed.

In some examples, the filtered image data, free of noisy pixels, may be provided to, received by, or otherwise accessed by a computing device of an autonomous vehicle. For instance, the autonomous vehicle may use the filtered image data to determine one or more trajectories for proceeding relative to objects determined from the filtered data. In some instances, depth and/or intensity information identified according to filtering techniques described herein may be combined, or fused, with data from other sensor modalities to determine the one or more trajectories.

Techniques described herein may be directed to leveraging sensor and perception data to enable a vehicle, such as an autonomous vehicle, to navigate through an environment while circumventing objects in the environment. Techniques described herein can utilize information sensed about the objects in the environment, e.g., by a time-of-flight sensor, to filter data and more accurately determine features of the objects. For example, techniques described herein may be faster and/or more robust than conventional techniques, as they may increase the reliability of depth and/or intensity information, potentially alleviating the need for extensive post-processing, duplicate sensors, and/or additional sensor modalities. That is, techniques described herein provide a technological improvement over existing sensing, object detection, classification, prediction and/or navigation technologies. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system in which inconsistent sensor data exists, e.g., caused at least in part by glare, may benefit from the techniques described. By way of non-limiting example, techniques described herein may be used on aircrafts, e.g., to correct intensities and/or depths associated with objects in an airspace or on the ground. Moreover, non-autonomous vehicles could also benefit from techniques described herein, e.g., for collision detection and/or avoidance systems. The techniques described herein may also be applicable to non-vehicle applications. By way of non-limiting example, techniques and implementations described herein can be implemented in any system, including non-vehicular systems, that generates, uses, and/or outputs sensor data, such as time-of-flight sensor data.

FIGS. 1-5 provide additional details associated with the techniques described herein.

Figure 1:
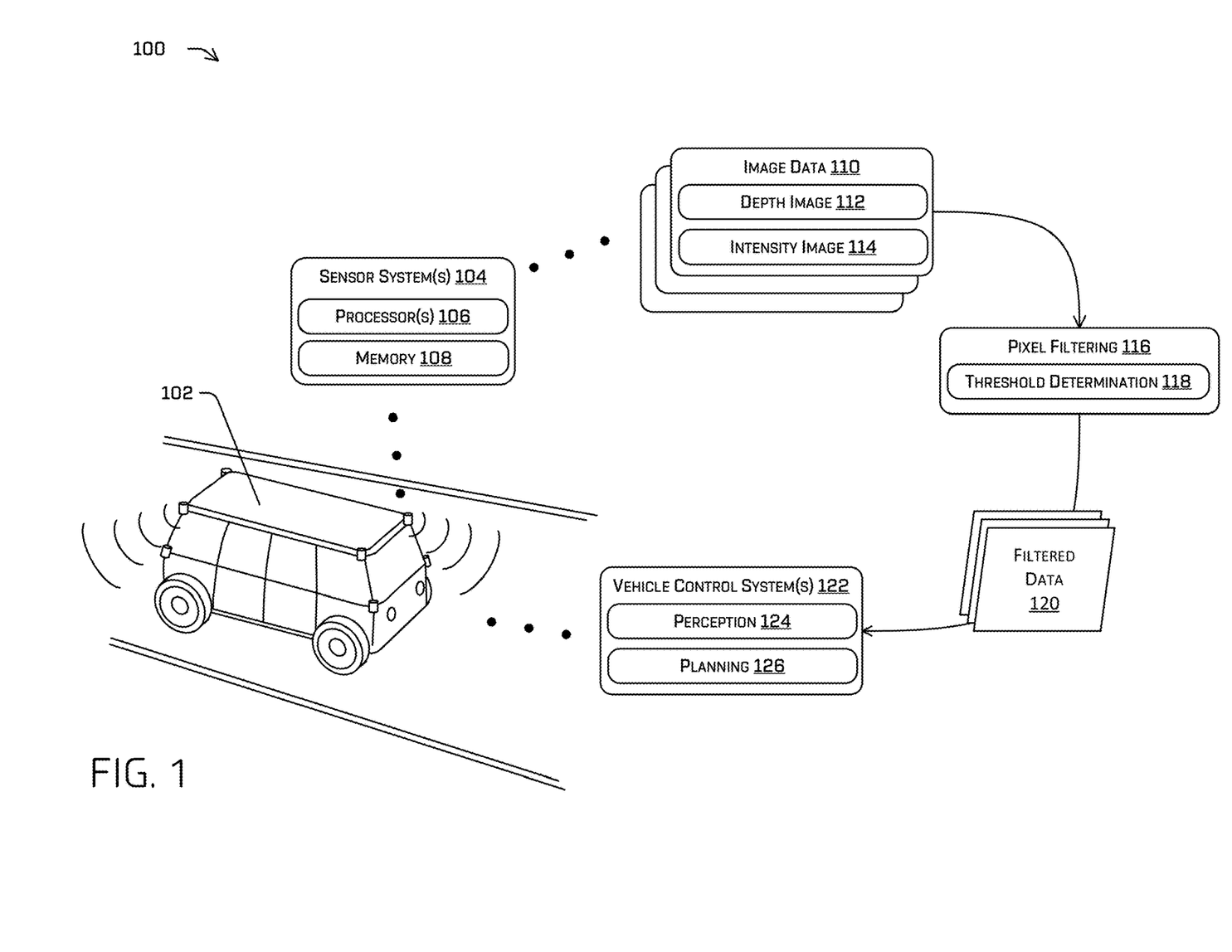
FIG. 1 is a schematic illustration showing an example vehicle, such as an autonomous vehicle, and example components and functionality of a sensor system associated with the vehicle, as described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 102 can be used to travel through an environment and collect data. For example, the vehicle 102 can include one or more sensor systems 104. The sensor system(s) 104 can be, for example, one or more time-of-flight sensors, LiDAR sensors, RADAR sensors, SONAR sensors, image sensors, audio sensors, infrared sensors, location sensors, etc., or any combination thereof. Certain implementations described herein may be particularly well-suited for use with time-of-flight sensors, although other types of sensors also are contemplated. The sensor system(s) 104 may be disposed to capture sensor data associated with the environment. For example, the sensor data may be processed by a vehicle control system to identify and/or classify objects in the environment, e.g., trees, vehicles, pedestrians, buildings, road surfaces, signage, barriers, road marking, or the like and/or to navigate the vehicle 102 relative to such object(s).

As also illustrated in FIG. 1, the sensor system(s) 104 can include one or more processors 106 and memory 108 communicatively coupled to the processor(s) 106. The memory 108 can store processor-executable by the processor(s) 106 to cause the sensor system(s) 104 to perform functions that quantify glare and image data and/or correct the data to remove the impact of the glare, as detailed herein. The processor(s) 106 and/or the memory 108 may be physically integrated into the sensor system(s), e.g., as an SoC, FPGA, ASIC, or the like, or, in some implementations, the processor(s) 106 and/or the memory 108 may be available to, e.g., connected to receive signals from and/or send signals to, the sensor system(s) 104. As discussed above, the sensor system(s) 104 can determine the sensor data in various formats (e.g., a quadrature format, an intensity and depth format, and/or an unprojected format) using the processor(s) 106.

In the example of FIG. 1, the sensor system(s) 104 may include a time-of-flight sensor, which may be configured to emit a carrier (e.g., a signal) and receive, e.g., capture, a response carrier (e.g., a response signal) comprising the carrier reflected off a surface in the environment. The time-of-flight sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as an intensity image and a depth image, respectively. For example, using the quadrature data, the sensor system can determine depth values and intensity values for each of a plurality of pixels representing a sensed environment and generate the depth and intensity images based on such values.

As also illustrated in FIG. 1, the sensor system(s) 104 may be configured to output the sensor data, e.g., the intensity and depth information, the quadrature values, or the like, as image data 110. The image data 110 may be embodied as image frames. The image data 110 can include a stream of serially-generated (e.g., at a predetermined interval) image frames. Generally, each of the frames 110 may include the same type of data, e.g., data related to the intensity and depth for each of a plurality of pixels comprising the receiver of the sensor. As illustrated in FIG. 1, the image data 110 can include a depth image 112 and an intensity image 114 generated by the sensor system(s) 104 and representative of a portion of the environment 100. Similarly, other instances, e.g., frames, of the image data 110 can include both an intensity image and a depth image representative of the environment 100 at the corresponding sensing time.

A time-of-flight sensor operates by sending a continuous amplitude-modulated light, e.g., a sinusoid-shaped light out. It comes back. When received after reflecting off a target, the return signal has a phase shift. The sensor computes the phase difference between the emitted signal and the received signal. It creates a correlation function between what's emitted and what's received. The correlation function uses four points. To create one depth image, we may need multiple images from the sensor—amplitude modulated frequency will put a cap on unambiguous range so we use two frequencies to extend our unambiguous range. So, change the frequency of the As noted above, different attributes of the environment 100 can result in degraded sensor data quality. For instance, ambient light, e.g., sunlight, may have the same or a similar wavelength as illumination light emitted and thus, can be perceived at pixels of the time-of-flight sensor as returns, despite not corresponding to emitted light. Moreover, highly reflective objects can create stray light that creates blur or glare. In time-of-flight sensors, such stray light may cause data saturation from which accurate depth s cannot be obtained. In addition, time-of-flight sensors may have a relatively short dynamic range, e.g., on the order of only a few meters, and returns off objects outside that dynamic range can be relatively weak, and thus provide inaccurate depth and/or unreliable, and generally low, intensity measurements. Techniques described herein can identify noisy pixels, e.g., pixels having potentially inaccurate depth and/or intensity measurements caused by one or more environmental conditions, including those just described. Once identified, those pixels can be filtered, e.g., removed from or otherwise identified in the image data 110, as being unreliable. Filtering the image data 110 according to techniques described herein can provide a reduced or "clean" dataset that may better represent the environment and/or may have a higher associated confidence.

As illustrated in FIG. 1, a pixel filtering system 116 may be configured to receive the image data 110 generated by the sensor system(s) 104. In more detail, the pixel filtering system 116 can include a threshold determination component 118. For clarity, the pixel filtering system 116 (and its components) are illustrated separate from the sensor system(s) 104 and from one or more vehicle control system(s) 122. However, portions of the pixel filtering system 116 may be implemented on one or both of the sensor system(s) 104 and/or the vehicle control system(s) 122. By way of non-limiting example, the processor(s) 106 may be configured to execute actions associated with the threshold determination component 118.

The threshold determination component 118 may be configured to determine a threshold against which a measured value can be measured, e.g., to determine whether to filter the pixel or keep the pixel. In some examples, the threshold determination component 118 can determine a threshold intensity. Pixels in the depth image 112 having an intensity below the threshold intensity may be identified as unreliable or "bad" pixels and thus filtered out or otherwise excluded from the image data 110. In one example, the threshold determination component 118 can apply a single intensity threshold to all pixels, e.g., any pixels having an intensity below the threshold image are excluded whereas those having an intensity equal to or above the single intensity threshold are retained (for subsequent use and/or processing). However, applying a single intensity threshold to all pixels may be insufficient. For example, while pixels associated with background objects (e.g., objects beyond the dynamic range of the sensor) may tend to have relatively lower intensity valid objects, e.g., in the dynamic range, can also have relatively lower intensities, and in some instances, intensities below the intensities associated with the background. Accordingly, applying a single threshold can result in removal of reliable pixels, which happen to have lower intensities.

In aspects of this disclosure, the threshold determination component 118 can determine an intensity threshold for a single pixel or subset of pixels. The image data 110 can then be filtered by comparing measured intensity values for the single pixel or pixels in the subset, e.g., from the intensity image 114, to the threshold for that pixel/subset. In examples, the threshold intensity can be based on data, e.g., pixel data, from one or both of the depth image 112 and/or the intensity image 114, as described herein.

In some examples, the threshold determination component 118 can determine a per-pixel intensity based on a distance or depth associated with the pixel. Conceptually, objects that are closer to a sensor, e.g., within a threshold distance of the sensor system(s) 104, may be more likely to cause stray light, e.g., glare as a by-product of reflections therefrom. In contrast, farther-away objects, including objects outside the dynamic range of the sensor system(s) 104, are less likely to cause such glare. Accordingly, in examples, the threshold determination component 118 can determine the threshold intensity for a pixel as an intensity that is inversely proportional to the depth associated with that pixel, e.g., as determined from the depth image 112. Stated differently, intensity of pixels associated with objects that are relatively closer to the sensor system(s) 104 can be compared to a higher threshold than pixels associated with objects that are relatively farther away. As a result, pixels with a relatively higher intensity will be retained for closer objects.

In some implementations, the threshold determination component 118 can determine an intensity threshold based on information about depth values for an area or subset of pixels. Conceptually, a sensed object or surface will return depths with less variance than will background objects. In contrast, objects within the dynamic range of the sensor will return stronger, and more uniform depth measurement. Consider an example of a vehicle in a field of view of the sensor system(s) 104. Although, and depending on the orientation of the vehicle relative to the sensor system(s) 104, a depth may vary across the entirety of the vehicle, the depth will be substantially uniform in any relatively small cluster of pixels associated with the object. Accordingly, the threshold determination component 118 can determine the intensity threshold for a pixel as an intensity that is proportional to the variance of a group of pixels including the pixels. Thus, for example, a relatively higher depth variance associated with a pixel will result in a higher intensity threshold and, conversely, a relatively lower depth variance associated with a pixel will result in a relatively lower intensity threshold. A broader range of pixel values will be filtered or otherwise excluded in the first instance, whereas a smaller range will be filtered in the second. As a result, the assumption that objects have less depth variation than background will result in retaining more pixels associated with those objects and excluding more pixels associated with the background.

The threshold determination component 118 can also determine the intensity threshold based at least in part on intensity information. For example, some objects may be viewed as relatively darker in the intensity image 114, e.g., having lower intensities, despite being objects in the dynamic range of the sensor. For example, objects with low reflectivity or high light absorption properties can result in lower intensity returns. However, pixels associated with such objects may be filtered out because of their relatively low intensity values. In techniques described herein, the threshold determination component 118 can determine the threshold intensity based on an average intensity or average energy associated with a region or subset of pixels. For instance, the threshold determination component 118 can determine the intensity threshold for a pixel as an intensity that is proportional to an average intensity or energy of a group of pixels including the pixel. Accordingly, a lower threshold will be used in areas that have a relatively lower average intensity whereas a higher threshold will be used in areas that have a relatively higher average intensity. Conceptually, higher energy areas will have higher intensity noise and lower intensity areas will have lower intensity noise.

In at least some examples, the threshold determination component 118 can solve Equation (1) to determine the threshold intensity for a pixel:

$$I < k \frac{\sigma_d^m \times E_i^n}{d^l} \qquad (1)$$

In the equation, $\sigma_d$ is the depth variance for a group of pixels, $E_i$ is the average intensity or average energy for a group of pixels, d is a depth to a region or pixel, and k is a constant. In examples, m, n, and/or l can be proportional, e.g., linearly proportional, proportional to a scale, or otherwise determined. In some examples, the regions over which $\sigma_d$, $E_i$, and/or d are determined can be any subset of pixels including the pixel to be considered against the threshold. In at least one example, $\sigma_d$ can be determined over a region including 9 pixels (e.g., an array of three-by-three pixels, which may be centered on the pixel under consideration), E can be determined over a region including 81 pixels (e.g., an array of nine-by-nine pixels, which may be centered on the pixel under consideration), and d can be the distance to the pixel under consideration. These values are for example only—others may be used. Moreover, the shape of the region to be considered may be other than square. In instances, k, m, n, and/or 1 can be tuned based on the application, for instance, using heuristics.

As illustrated, Equation (1) uses each of the pixel depth, the depth variance, and the average energy, and specifically, powers (represented by m, n, and l) of the pixel depth, the depth variance, and the average intensity, as factors for determining the threshold intensity. In other examples, the threshold determination component 118 can use any one or any two of these factors to determine the threshold intensity. By way of non-limiting example, implementations of the threshold determination component 118 can use only the depth image 112 to determine the threshold intensity. In such example(s), either or both of the depth to pixel (d) (or a power of the depth) and depth variance ($\sigma_d$) (or a power of the depth variance) may be used to determine the intensity threshold (I). Moreover, although the Equation (1) uses a combination of each of the pixel depth, the depth variance, and the average energy, to do a single thresholding step, other examples could do more than one step. For instance, a first threshold, determined using some subset of the factors, could be used to create a first-pass filter, and pixels that are not filtered out could then be compared to a second threshold determined using some different subset of the factors.

The threshold determination component 118 may also determine thresholds, e.g., intensity thresholds using additional factors and/or techniques. By way of non-limiting example, the threshold determination component 118 may generate, receive, and/or otherwise access an intensity histogram associated with the depth image 112. For example, the threshold determination component 118 may identify a frequency of the highest (e.g., equal to or above a threshold) intensity values in the histogram, and determine the threshold intensity based thereon. For instance, the threshold may be directly proportional to the frequency of the high intensity values. Conceptually, higher thresholds can be used to filter higher intensity images. In examples, this thresholding can be incorporated into the Equation (1), e.g., as another term in the numerator, or the threshold determination component can determine a separate, e.g., first pass filter, threshold, based on the histogram, as just discussed. In some examples, pixels may be serially filtered using the different thresholds.

As also illustrated in FIG. 1, the pixel filtering system 116 can output filtered data 120, which can include pixels that have not been filtered based on the thresholds determined by the threshold determination component. In some instances, the filtered data 120 can include the depth image 112 and/or the intensity image 114, but with the filtered points removed. By way of non-limiting example, the filtered data 120 can include only those pixels associated with an object.

As also illustrated in FIG. 1, the filtered data 120 may be transmitted to the vehicle control system(s) 122, e.g., for use in controlling the vehicle 102. By way of non-limiting example, the vehicle control system(s) 122 can include a perception system 124 and a planning system 126. In examples, the perception system 124 may receive the corrected data and perform one or more of object detection, segmentation, and/or classification to determine objects in the data. The planning system 126 may determine a trajectory or route for the vehicle 102, e.g., relative to objects perceived by the perception system 124 from the filtered data 120.

Providing the vehicle control system(s) 122 with the filtered data 120 can improve safety outcomes, e.g., relative to providing the vehicle control system(s) 122 with the image data 110 including noise from stray light and/or other factors. In at least some examples, time-of-flight sensors may be used on vehicles, such as the vehicle 102, to provide critical information about objects immediately surrounding the vehicle 102. Thus, removing noise from sensor data, and providing only data related to objects, can streamline processing, further increasing the speed at which these critical functions can be performed.

Figure 2:
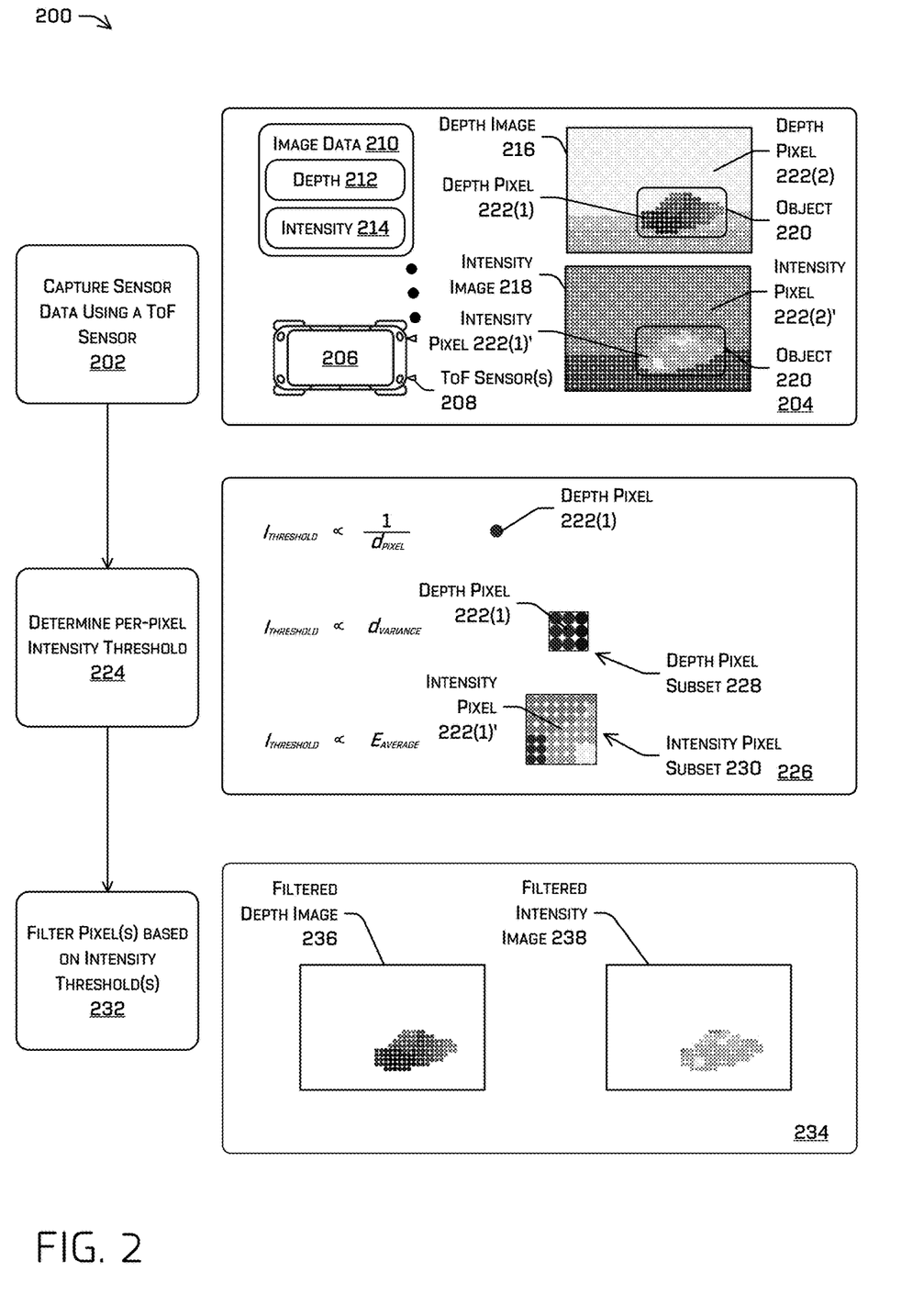
FIG. 2 includes textual and pictorial flowcharts of an example method for filtering pixels in image data captured by a sensor, such as a time-of-flight sensor, as described herein.

FIG. 2 includes textual and graphical flowcharts illustrative of a process 200 for correcting for glare, according to implementations of this disclosure. For example, the process 200 can be implemented using components and systems illustrated in FIG. 1 and described above, although the process 200 is not limited to being performed by such components and systems. Moreover, the components and systems of FIG. 1 are not limited to performing the process 200.

In more detail, the process 200 can include an operation 202 that includes capturing sensor data using a time-of-flight sensor. As noted above, techniques described herein may be particularly applicable to use with time-of-flight sensors, and the example of FIG. 2 uses time-of-flight sensors as one specific example. The disclosure is not limited to use with time-of-flight sensors, as techniques described herein may be applicable to other types of sensors that may be adversely affected by glare. In some examples, the operation 202 can include receiving both depth and intensity data measured by the time-of-flight sensor.

An example 204 accompanying the operation 202 illustrates a vehicle 206, which may be the vehicle 102 in some examples. One or more time-of-flight sensors 208 are mounted on the vehicle 206, e.g., to sense an environment surrounding the vehicle 102. For instance, the time-of-flight sensor(s) 208 may be arranged to sense objects generally in a direction of travel of the vehicle 206, although the sensors may be otherwise disposed and more or fewer sensors than the two illustrated may be present. As noted above, the time-of-flight sensor(s) 208 may be specifically configured to detect objects relatively close, e.g., within about 4 meters or less, to the vehicle 206. The time-of-flight sensor(s) 208 may be configured to generate image data 210, which can include depth information 212 and intensity information 214. In at least some examples, the depth information 212 can include or be embodied as a depth image 216 and the intensity information 214 can include or be embodied as an intensity image 218. As illustrated in the example 204, the depth image 216 can represent a depth of sensed objects in a scene on a pixel-by-pixel basis and the intensity image 218 can represent an intensity (e.g., brightness) of sensed objects in the scene on the same pixel-by-pixel basis. In the example, the depth image 216 and the intensity image 218 may include information about an object 220, which, for example, may be a vehicle travelling on a road proximate the vehicle 206. The depth image 216 and the intensity image 218 may be generated at substantially simultaneously the same time. In the representation of the depth image 216, relatively lighter pixels may represent objects that are farther away (e.g., background objects) whereas as relatively darker pixels may represent relatively closer objects. The example 204 specifically identifies a first depth pixel 222(1) in the depth image 216 associated with the object 220 and a second depth pixel 222(2) associated with a background of the sensed environment. The example 204 also outlines the object 220 in the intensity image 218. In the intensity image 218, relatively lighter pixels may represent higher intensity whereas relatively darker pixels may represent lower intensity. The example 204 specifically identifies a first intensity pixel 222(1)' and a second intensity pixel 222(2)' in the intensity image 218. The first depth pixel 222(1) and the first intensity pixel 222(1)' generally correspond to the same portion of the object 220, e.g., they are associated and include intensity and depth information, respectively, for the same portion of the same surface in the environment. Similarly, the second depth pixel 222(2) and the second intensity pixel 222(2)' generally correspond to the same portion of the background of the environment, e.g., they are associated and include intensity and depth information, respectively, for the same portion of the same surface or feature in the background. Stated differently, the depth associated with the first depth pixel 222(1) and the intensity associated with the first intensity pixel 222(1)' may describe attributes (depth and intensity) of the same pixel.

At an operation 224, the process 200 can also include determining a per-pixel intensity threshold. As described further herein, pixel noise may result from factors including, but not limited to, glare, stray light, a dynamic range of the sensor, or the like. The operation 224 may generate an intensity threshold, e.g., on a per-pixel basis, to which intensity values from the intensity image 218 are compared. The thresholds may be determined to filter an increased number of pixels that are not associated with a detected object proximate the vehicle 206 while retaining a maximum number of pixels that are associated with such detected objects.

An example 226 accompanying the operation 224 illustrates factors that may be considered in determining the intensity threshold. Specifically, the example 226 shows that an intensity threshold for an intensity pixel ($I_{threshold}$, which may correspond to I in Equation (1), discussed above) can be inversely proportional to a depth of an associated depth pixel. For example, the value of the depth of the depth pixel 222(1), e.g., distance from the sensor as contained in the depth image 216, can be a factor in determining the intensity threshold for the intensity pixel 222(1)'. As described herein, objects that are relatively closer to a sensor, such as the time-of-flight sensor(s) 208, can cause more noise, e.g., glare or other stray light, so the intensity threshold may be higher for closer objects, e.g., to remove relatively higher intensity noise. Although the depth is shown as a depth to a single pixel, e.g., the depth pixel 222(1), in other implementations, the depth may be to a region, which may be an average depth value of a subset of the depth pixels in some examples. Moreover, although the intensity threshold is shown as inversely proportional to the depth of the depth pixel, in examples, including those discussed above with reference to Equation (1), the intensity threshold may be inversely proportional to a power of the depth, e.g., $d^l$.

The example 226 also shows that the intensity threshold ($I_{threshold}$) can be proportional to a depth variance (e.g., $\sigma_d$ in Equation (1), discussed above) of a depth pixel subset 228 including the depth pixel 222(1). As described herein, returns associated with detected objects, e.g., objects in the dynamic range of the time-of-flight sensor(s) 208, may have relatively uniform depths, so the intensity threshold may be lower for pixels associated with a lower depth variance. Practically, only pixels in a smaller intensity range will be filtered if those pixels are associated with an object, as determined by the depth variance. The example 226 shows that the depth pixel subset 228 includes nine pixels (e.g., a 3×3 array) centered on the depth pixel 222(1). However, depths associated with more or fewer depth pixels can be used in implementations. Moreover, although the intensity threshold is shown as directly proportional to the depth variance, in examples, including those discussed above with reference to Equation (1), the intensity threshold may be directly proportional to a power of the depth variance, e.g., $\sigma_d^m$.

In addition to using information from the depth image 216 to determine intensity thresholds, the example 226 also shows that the intensity threshold ($I_{threshold}$) can be proportional to an average intensity or average energy (e.g., $E_i$ in Equation (1), discussed above) of an intensity pixel subset 230 including the intensity pixel 222(1). As described herein, higher intensity areas may have higher intensity noise, whereas lower intensity areas may have lower intensity noise. In some instances, considering an average intensity may better preserve pixels associated with objects that may have a relatively lower intensity, e.g., relatively darker objects or objects in relatively darker regions. Although not illustrated in FIG. 2, other factors, including intensity information from a histogram or the like may also be used to determine the intensity threshold and/or to otherwise filter pixels. In at least some examples, the operation 224 can include determining the intensity threshold using the Equation (1), described above. Furthermore, though illustrated as a single step (e.g., operation 224), independent thresholds may be determined and subsequently applied to the image data 210 for filtering. Moreover, although the intensity threshold is shown as directly proportional to the average intensity, in examples, including those discussed above with reference to Equation (1), the intensity threshold may be directly proportional to a power of the average intensity, e.g., $E_i^n$.

At operation 232, the process 200 can include filtering pixel(s) based on the intensity threshold(s). For example, the operation 232 can include comparing an intensity value e.g., a measured intensity value contained in the intensity image 218, to the threshold determined at the operation 224. In examples, if the measured intensity associated with the intensity pixel is lower than the threshold intensity, the pixel is discarded, removed, ignored, or otherwise filtered out (e.g., in either one or both of the intensity image 218 and the depth image 216). Alternatively, if the measured intensity is equal to or greater than the threshold intensity, the pixel is retained. In an example 234 accompanying the operation 232, filtered data can include a filtered depth image 236 and a filtered intensity image 238. As illustrated, the filtered depth image 236 and the filtered intensity image 238 may include information about depth pixels and intensity pixels associated with an object in the dynamic range of the time-of-flight sensor(s) 208, but may exclude pixels associated with background elements or with objects in the dynamic range, but not sensed by the time-of-flight sensor(s) 208.

Figure 3:
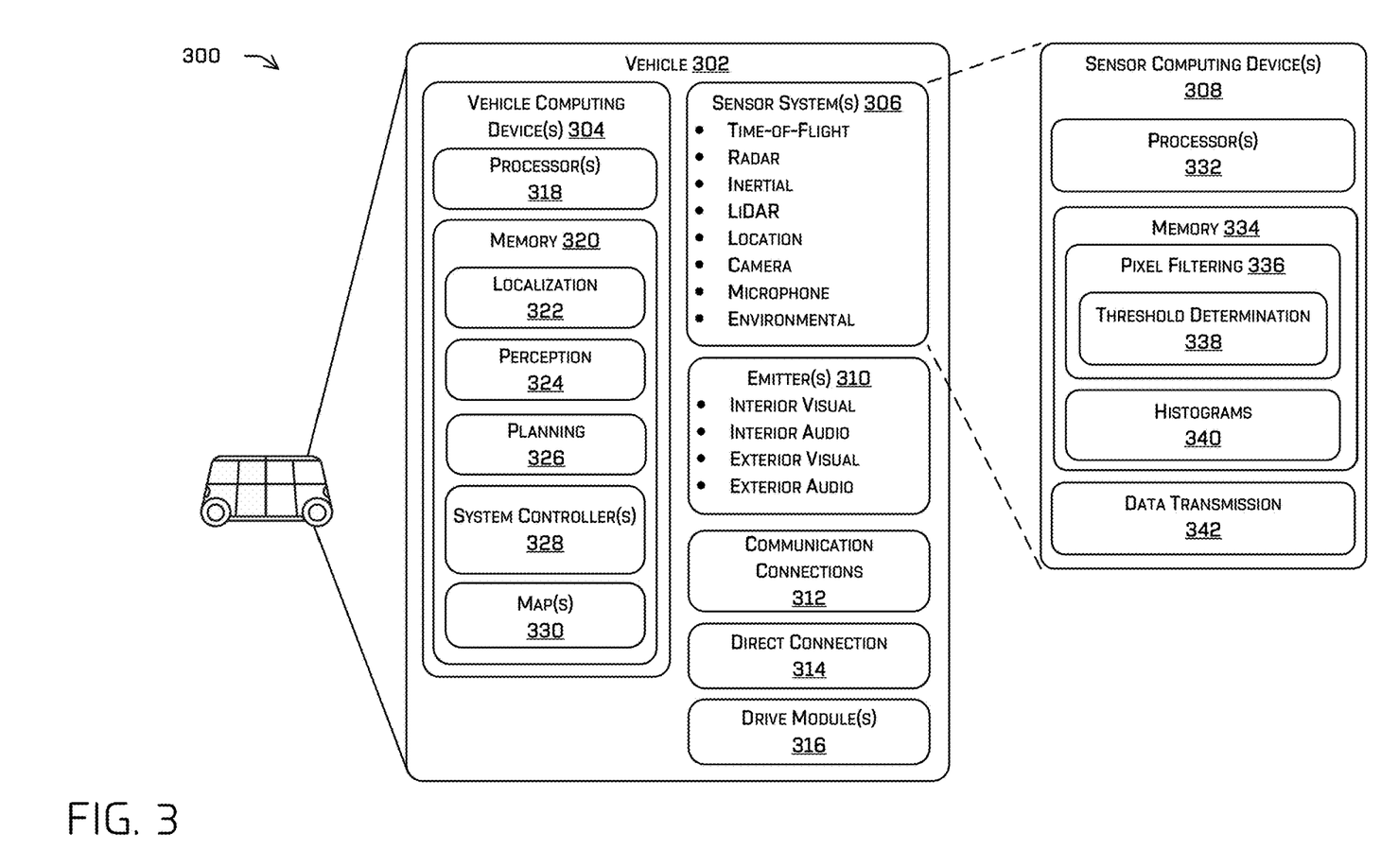
FIG. 3 depicts a block diagram of an example computing system for filtering sensor data by removing pixels including excess noise, as described herein.

FIG. 3 depicts a block diagram of an example system 300 for implementing the techniques discussed herein. In at least one example, the system 300 can include a vehicle 302, which can be similar to (or the same as) the vehicle 102 described above with reference to FIG. 1. In the illustrated example 300, the vehicle 302 is an autonomous vehicle; however, the vehicle 302 can be any other type of vehicle.

The vehicle 302 can include one or more vehicle computing devices 304, one or more sensor systems 306, which may include one or more sensor computing devices 308, one or more emitter(s) 310, one or more communication connections 312, at least one direct connection 314 (e.g., for physically coupling with the vehicle 302 to exchange data and/or to provide power), and one or more drive modules 316. In some instances, the vehicle 302 can include more or fewer instances of the vehicle computing device(s) 304. The sensor system(s) 306 can be configured to capture sensor data associated with an environment. In examples, the sensor system(s) 306 can include the sensor system(s) 104 and/or the time-of-flight sensor(s) 208.

The vehicle computing device(s) 304 can include one or more processors 318 and memory 320 communicatively coupled with the one or more processors 318. In at least one instance, the processor(s) 318 can be similar to the processor(s) 106 and the memory 320 can be similar to the memory 108 described above with reference to FIG. 1. In the illustrated example, the memory 320 of the vehicle computing device(s) 304 stores a localization component 322, a perception component 324, a planning component 326, one or more system controllers 328, and one or more maps 330. Though depicted as residing in the memory 320 for illustrative purposes, it is contemplated that the localization component 322, the perception component 324, the planning component 326, and/or the system controller(s) 328 can additionally, or alternatively, be accessible to the vehicle computing device(s) 304 (e.g., stored in a different component of vehicle 302 and/or stored remotely).

In at least one example, the localization component 322 can include functionality to receive data from the sensor system(s) 306 to determine a position of the vehicle 302. In instances described herein, in which the sensor system(s) 306 include a time-of-flight sensor, the localization component 322 can receive filtered data, such as the filtered data 120, from which noisy pixels have been removed. In examples, the filtered data can include the filtered depth image 236 and/or the filtered intensity image 238. In other implementations, the localization component 322 can include and/or request/receive a three-dimensional map, e.g., of the map(s) 330 of an environment and can continuously determine a location of the autonomous vehicle within the map. In some instances, the localization component 322 can use SLAM (simultaneous localization and mapping) or CLAMS (calibration, localization and mapping, simultaneously) to receive image data, such as from the time-of-flight sensor, LiDAR data, RADAR data, SONAR data, IMU data, GPS data, wheel encoder data, or any combination thereof, and the like to accurately determine a location of the autonomous vehicle 302. In some instances, the localization component 322 can provide data to various components of the vehicle 302 to determine an initial position of an autonomous vehicle for generating a candidate trajectory, as discussed herein.

In some examples, the perception component 324 can include functionality to perform object detection, segmentation, and/or classification. In some examples, the perception component 324 can receive data including the corrected image data 242 and generate processed sensor data that indicates a presence of an object in the environment of, e.g., proximate, the vehicle 302 and/or a classification of the object as an object type (e.g., car, pedestrian, cyclist, building, tree, road surface, curb, sidewalk, unknown, etc.). In additional and/or alternative examples, the perception component 324 can provide processed sensor data that indicates one or more characteristics associated with a detected object and/or the environment in which the object is positioned. In some examples, characteristics associated with an object can include, but are not limited to, an x-position (global position), a y-position (global position), a z-position (global position), an orientation, an object type (e.g., a classification), a velocity of the object, an extent of the object (size), or the like. Characteristics associated with the environment can include, but are not limited to, a presence of another object in the environment, a state of another object in the environment, a time of day, a day of a week, a season, a weather condition, an indication of darkness/light, etc.

In some instances, the planning component 326 can determine a path for the vehicle 302 to follow to traverse through an environment. For example, the planning component 326 can determine various routes and trajectories and various levels of detail. In some examples, the planning component 326 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 326 can generate an instruction for guiding the autonomous vehicle along at least a portion of the route from the first location to the second location. In at least one example, the planning component 326 can determine how to guide the autonomous vehicle from a first waypoint in the sequence of waypoints to a second waypoint in the sequence of waypoints. In some examples, the instruction can be a trajectory, or a portion of a trajectory. In some instances, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning component 326 can alternatively, or additionally, use data from the perception component 324 to determine a path for the vehicle 302 to follow to traverse through an environment. For example, the planning component 326 can receive data from the perception component 324 regarding objects associated with an environment. Using this data, the planning component 326 can determine a route to travel from a first location (e.g., a current location) to a second location (e.g., a target location) to avoid objects in an environment.

As noted above, the vehicle computing device(s) 304 can include the system controller(s) 328, which can be configured to control steering, propulsion, braking, safety systems, emitters, communication systems, and/or other systems of the vehicle 302. The system controller(s) 328 can communicate with and/or control corresponding systems of the drive module(s) 316 and/or other components of the vehicle 302, which may be configured to operate in accordance with a trajectory provided from the planning component 326.

In some examples, the map(s) 330 can be stored on a remote computing device. Multiple maps 330 can be stored based on, for example, a characteristic (e.g., type of entity, time of day, day of week, season of the year, etc.). Storing multiple maps 330 can have similar memory requirements, but increase the speed at which data in a map can be accessed.

In at least one example, the sensor system(s) 306 can be similar to the sensor system(s) 104 described above with reference to FIG. 1. The sensor system(s) 306 can include time-of-flight sensors, such as the time-of-flight sensor(s) 208, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 306 can include multiple instances of each of these or other types of sensors. For instance, the time-of-flight sensors can include individual time-of-flight sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device(s) 304.

The sensor system(s) 306 can include the sensor computing device(s) 308, which can include one or more processors 332 and memory 334 communicatively coupled with the one or more processors 332. The one or more processors 332 can be similar to the processor(s) 106 and/or to the processor(s) 318, described above. The memory 334 can be similar to the memory 108 and/or to the memory 320, described above. In the illustrated example, the memory 334 of the sensor computing device(s) 308 can store a pixel filtering system 336, which can include a threshold determination component 338, and one or more histograms 340. Though depicted as residing in the memory 334 for illustrative purposes, it is contemplated that the pixel filtering system 336 (as well as its associated components) and/or the histograms 340 can additionally, or alternatively, be accessible to the sensor system(s) 306 (e.g., stored in a different component of vehicle 302 and/or stored remotely). Moreover, although the pixel filtering system 336 (as well as its associated components) and the histograms 340 are illustrated as being stored in and/or part of the sensor computing device(s) 308, in other implementations any or all of these components may be stored in the memory 320 and/or in some other, not illustrated memory, such as a remote memory associated with a remote computing device. That is, although FIG. 3 illustrates several components as being part of the sensor computing device(s) 308 of the sensor system(s) 306, the processing associated with any or all of those components may be performed other than at the sensor. In one example, the sensor system(s) 306 may output raw data, e.g., the quadrature data discussed above, for processing in accordance with functionality ascribed herein to one or more of the pixel filtering system 336, and/or the threshold determination component 338, but that processing may be performed other than at the location of the emitter and the receiver. Moreover, the histograms 340 may be generated (and stored) other than by the sensor computing device(s) 308. Without limitation, the sensor system(s) 306 can include on-board processing capabilities to perform any or all functionality described herein and associated with correcting glare on the sensor. Alternatively, processing of the sensor data may be processed to correct for glare other than at the sensor system(s) 306.

The sensor computing device(s) 308, including the pixel filtering system 336, may be configured to generate and/or process data in many formats. For example, and as noted above, the sensor computing device(s) 308 can measure a phase shift between the carrier and the response carrier and/or perform numerical integration calculations to determine the sensor data in the quadrature format. In other examples, the sensor computing device(s) 308 can determine an intensity and depth format of the sensor data, e.g., generate the depth and intensity images. For purposes of illustration only, the sensor system(s) 306 can determine the sensor data in the intensity and depth format where an individual pixel in the sensor data is associated with an 8-bit value for the intensity and a 12-bit value for the depth.

The pixel filtering system 336 can be configured to receive sensor data generated by the sensor system(s) 306, e.g., by a time-of-flight senor, and filter the sensor data to remove pixels having excessive noise. In examples described herein, filtering sensor data can include retaining pixels associated with sensed objects and rejecting pixels associated with background objects and/or saturated pixels. For example, and as detailed herein, data generated by time-of-flight sensors can include noise, especially from stray light caused by a number of factors. Removing noisy pixels can provide down-stream systems with improved data. In examples described herein, pixel noise can be particularly problematic in implementations in which a distance to objects in the environment is required, e.g., to safely travel through an environment relative to such objects.

The threshold determination component 338 can determine threshold intensities, e.g., on a per-pixel basis, to which measured intensity values are to be compared. The threshold determination component 338 can correspond to the threshold determination component 118 detailed above. For example, the threshold determination component 338 can calculate an intensity threshold for a pixel in image data based on information about that pixel's depth and/or intensity. In examples, the threshold may be inversely proportional to the pixel's depth or a region including the pixel, may by directly proportional to a depth variation of a region including the pixel and/or may be directly proportional to an average intensity or energy of a region including the pixel. Also in examples, the threshold determination component may further determine one or more intensity thresholds based on the histograms 340, as described herein.

As described further herein, the pixel filtering system 336 may further compare a measured intensity of a pixel to the threshold intensity determined by the threshold determination component 338 for that pixel. When the measured intensity value is below the threshold intensity, the pixel may be rejected or otherwise removed from or disregarded in the image data. In contrast, when the measured intensity value equals or is greater than the threshold intensity, the pixel may be retained in the image data. For example, the depth value (and/or the intensity value) associated with retained pixel may be transmitted to systems such as the localization system 322, the perception system 324, and/or the planning system 326. Also The sensor computing device(s) 308 may also include functionality to generate the histograms 340. For instance, the histograms 340 may include, for each instance of image data, distributions of the depths and/or intensity values in the image data. The histograms 340 may be used also, e.g., by the threshold determination component 338, to generate intensity thresholds. In at least some examples, the histograms 340 may be used to identify bands, e.g., bands of intensities in the intensity image. For example, the histogram may be used to determine a band of intensities including intensities from the largest intensity to a midpoint of the intensities. The threshold determination component 338 may identify a threshold for filtering based on a number of occurrences in this higher-intensity band. A second band may include intensities above an intensity of the maximum occurring intensity. In examples, the threshold determination component 338 may identify the maximum occurring intensity as threshold for filtering the intensities. In examples, filtering based on the histograms may be done before or after other filtering techniques described herein.

The sensor computing device(s) 308 of the sensor system(s) 306 can also include a data transmission component 342. The data transmission component 342 can transmit the sensor data, e.g., filtered sensor data, from the sensor computing device(s) 308, e.g., to the localization component 322, the perception component 324, and/or the planning component 326.

The emitter(s) 310 are configured for emitting light and/or sound, as described above. In the illustrated example, the emitter(s) 310 can include interior visual and/or interior audio emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 310 in this example also include exterior emitters, which may be exterior visual and/or exterior audio emitters. By way of example and not limitation, the exterior emitters in this example can include lights to signal a direction of travel or other indicator of vehicle action (e.g., indicator lights, signs, light arrays, etc.) and one or more audio emitters (e.g., speakers, speaker arrays, horns, etc.) to audibly communicate with pedestrians or other nearby vehicles, one or more of which may comprise acoustic beam steering technology.

The communication connection(s) 312 enable communication between the vehicle 302 and one or more other local or remote computing device(s), including the sensor computing device(s) 308. For instance, the communication connection(s) 312 can facilitate communication with other local computing device(s) on the vehicle 302 and/or the drive module(s) 316. Also, the communication connection(s) 312 can allow the vehicle to communicate with other nearby computing device(s) (e.g., other nearby vehicles, traffic signals, etc.). The communications connection(s) 312 can also enable the vehicle 302 to communicate with a remote teleoperations computing device or other remote services.

The communications connection(s) 312 can include physical and/or logical interfaces for connecting the vehicle computing device(s) 304 to another computing device or an external network (e.g., the Internet). For example, the communications connection(s) 312 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In some examples, the drive module(s) 316 can include a single drive module 316. In other examples, the vehicle 302 can have multiple drive modules, and individual drive modules 316 can be positioned on opposite ends of the vehicle 302 (e.g., the front and the rear, etc.). In at least one example, the drive module(s) 316 can include one or more sensor systems to detect conditions of the drive module(s) 316 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, RADAR sensors, etc. Some sensors, such as the wheel encoders can be unique to the drive module(s) 316. In some cases, the sensor system(s) on the drive module(s) 316 can overlap or supplement corresponding systems of the vehicle 302 (e.g., the sensor system(s) 306).

The drive module(s) 316 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 316 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 316. Furthermore, the drive module(s) 316 also include one or more communication connection(s) that enable communication by the respective drive module with one or more other local or remote computing device(s).

The processor(s) 318 of the vehicle 302, the processor(s) 332 of the sensor computing device(s) 308, and/or the processor(s) 106 of the sensor system(s) 104 can be any suitable processor capable of executing instructions to process data and perform operations as described herein. By way of example and not limitation, the processor(s) 318, 332, 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 320, 334, 108 are examples of non-transitory computer-readable media. The memory 320, 334, 108 can store an operating system and one or more software applications, instructions, programs, and/or data to implement the methods described herein and the functions attributed to the various systems. In various implementations, the memory 320, 334, 108 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 320, 334, 108 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 4:
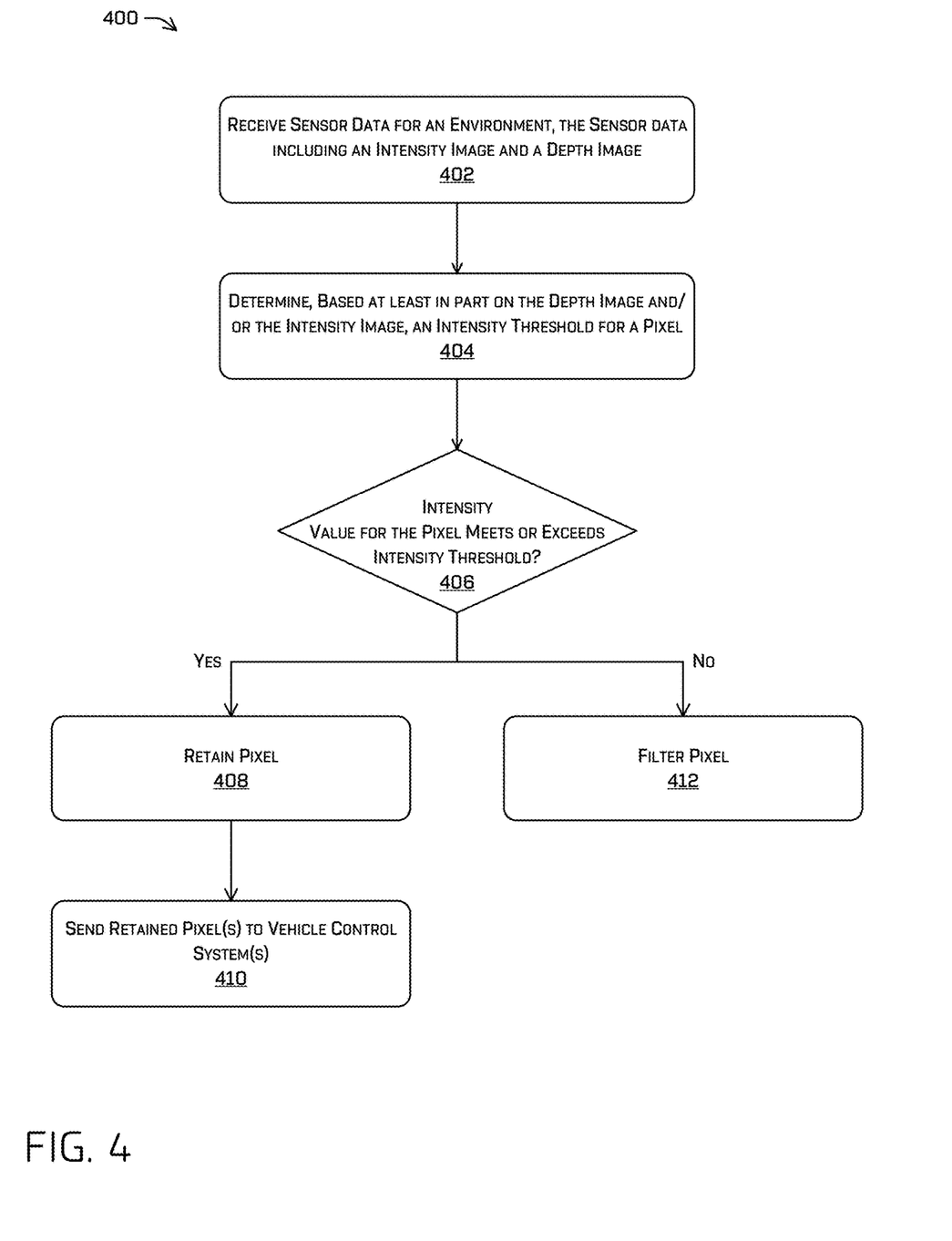
FIG. 4 is a flowchart illustrating an example method for filtering pixels in images captured by a sensor, such as a time-of-flight sensor, as described herein.
Figure 5:
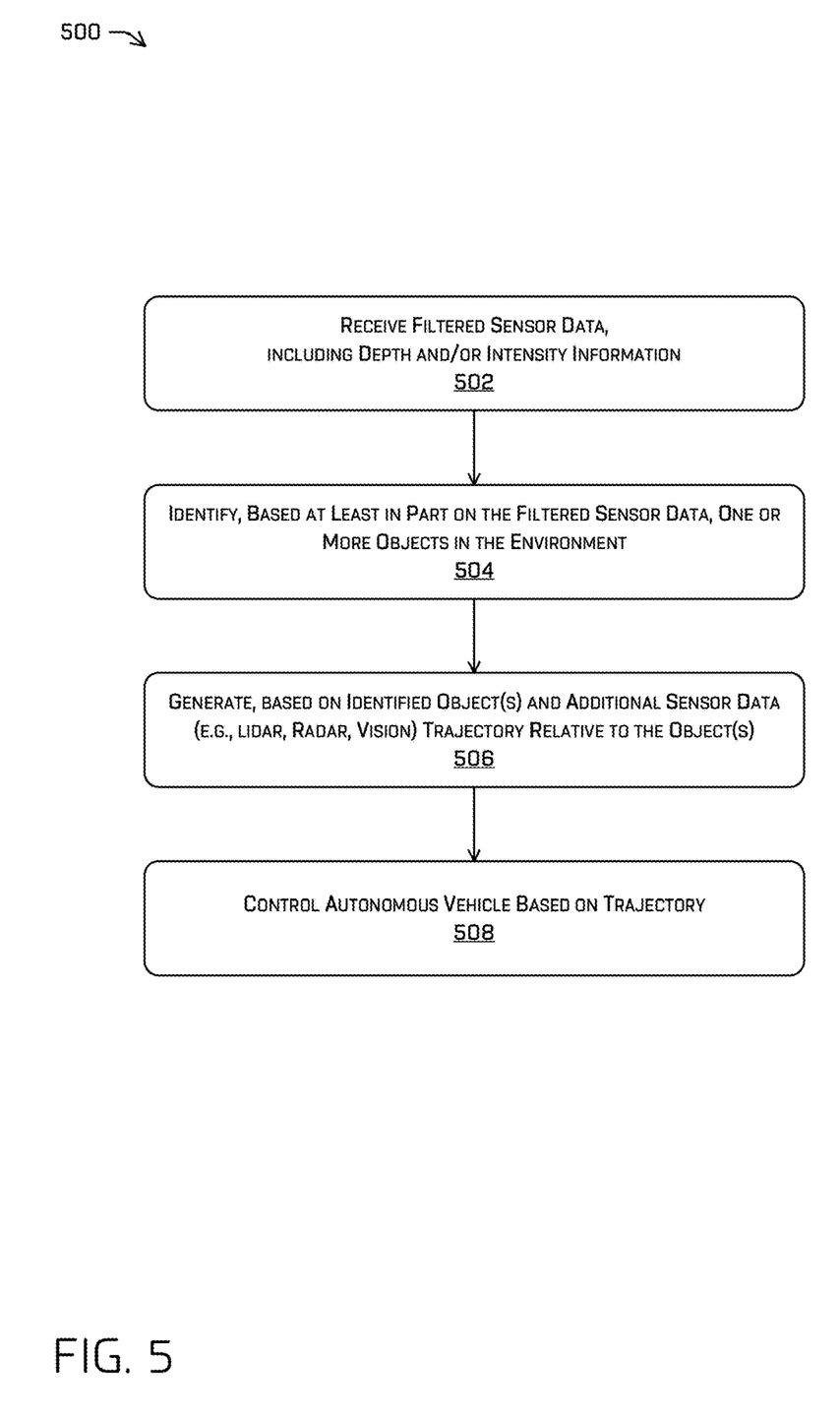
FIG. 5 is a flowchart illustrating an example method for controlling a vehicle relative to obstacles sensed by a sensor, such as a time-of-flight sensor, as described herein.

FIGS. 4 and 5 (and portions of FIG. 2, discussed above) illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

In more detail, FIG. 4 depicts an example process 400 for filtering measured data to remove noisy pixels, which may be affected by stray light. For example, some or all of the process 400 can be performed by the sensor system(s) 104 and/or by one or more components illustrated in FIG. 3, as described herein. For example, some or all of the process 400 can be performed by the sensor computing device(s) 308 of the sensor system(s) 306, including, but not limited to, the threshold determination component 338. However, the process 400 is not limited to being performed by these components, and the components are not limited to performing the process 400.

At operation 402, the process 400 includes receiving sensor data for an environment, the sensor data including an intensity image and a depth image. For example, techniques described herein may be useful for filtering pixels in sensor data received from a time-of-flight sensor. In these examples, the time-of-flight sensor generates a depth image describing depths for individual measured pixels and an intensity image describing intensities for the individual measured pixels.

At operation 404, the process 400 can include determining, based at least in part on the depth image and/or the intensity image, an intensity threshold for a pixel. For instance, the intensity threshold can be based at least in part on a depth of the pixel, a depth variance associated with a region including the pixel, and/or an average energy or intensity associated with a region including the pixel as described in detail herein. In other instances, the intensity threshold can be based at least in part on intensity histograms associated with the intensity image as further described herein. In at least some examples, the threshold intensity can be determined using the Equation (1), set forth and discussed above.

At operation 406, the process 400 can include determining whether an intensity value for the pixel meets or exceeds the intensity threshold. For instance, the operation 406 can include determining the measured intensity from the intensity image received at the operation 402, and comparing the measured intensity to the threshold intensity determined at the operation 404.

If, at the operation 406, it is determined that the intensity value meets or exceeds the intensity threshold, at operation 408 the process 400 includes retaining the pixel. For instance, the pixel may be determined to be a valid, accurate, or reliable pixel, and thus is retained for further processing. In examples, the retained pixel may be associated with a sensed object, as opposed to background objects and/or noise.

At operation 410, the process 400 can also include sending the retained pixel(s) to one or more vehicle control systems. For example, the sensor data may be associated with a sensor, such as a time-of-flight sensor disposed on a vehicle, and the sensor data may be used to identify objects and control the vehicle to navigate relative to the objects.

Alternatively, if, at the operation 406, it is determined that the intensity value is below the intensity threshold, at operation 412, the process 400 includes filtering the pixel. For instance, the pixel may be determined to be an invalid, inaccurate, or otherwise unreliable pixel, and thus is filtered from the sensor data. In examples, the filtered pixel can be removed, suppressed, ignored, or otherwise filtered.

FIG. 5 depicts an example process 500 for controlling an autonomous vehicle relative to objects in an environment, as discussed herein. For example, some or all of the process 500 can be performed by the vehicle 102 of FIG. 1 and/or the vehicle 302 and its related components illustrated in and discussed with reference to, FIG. 3. For example, some or all of the process 500 can be performed by the localization component 322, the perception component 324, the planning component 326, and/or the one or more system controllers 328.

At operation 502, the process can include receiving filtered sensor data, including depth and/or intensity information. In examples described herein, the sensor data may be filtered data determined in accordance with the process 400 and/or received from the operation 410. The sensor data may include a depth image and an intensity image containing the per-pixel values for pixels that were retained, e.g., at the operation 408 in the process 400. In examples, the filtered sensor data may include only those pixels associated with an object. The sensor data may be received from the time-of-flight sensor on a frame-by-frame basis, e.g., the sensor system may output data comprising a first frame (which includes both the depth image and the intensity image), a second frame, etc. In other examples, the sensor data may be a resolved frame (or data associated therewith), determined according to techniques disclosed in U.S. application Ser. No. 16/198,208, filed Nov. 21, 2018, and titled "Intensity and Depth Measurements in Time-of-Flight Sensors," the entire disclosure of which application is hereby incorporated by reference. As detailed therein, a resolved frame may include blended intensity determined using multiple frames of data at different integration times and/or different illumination intensities and/or disambiguated depths determined using multiple frames of data determined at different modulation frequencies. In still further embodiments the sensor data may be a representation of the environment, e.g., an image of the environment, generated using data from the time-of-flight sensor and/or data generated based on the data from the time-of-flight sensor.

At operation 504, the process 500 can include identifying, based at least in part on the filtered sensor data, one or more objects in the environment. For example, the localization component 322 and/or the perception component 324 may receive the depth and/or intensity data at 502 and identify objects in the environment. For example, the vehicle computing device(s) 304 may classify objects based on the sensor data and map the objects in the environment relative to the vehicle 302, e.g., using one or more maps like the map(s) 330. For instance, the depth and/or intensity information may be used, either alone or in combination with other data, to determine one or more bounding boxes, such as three-dimensional bounding boxes, representative of the sensed objects.

At operation 506, the process 500 can include generating, based on the identified object(s) and additional sensor data (e.g., LiDAR data, radar data, vision data), a trajectory relative to the object(s). For example, the planning component 326 of the vehicle computing device(s) 304 can further determine relative movement, e.g., velocity and acceleration, of the objects in the environment using one or more sensor modalities, object classification data, and the maps 330 and/or other information to determine the trajectory. For example, the trajectory may define at least a portion of a travel path for the vehicle. In some examples, the trajectory and/or travel path may be based at least in part on fused data including data from one or more sensor modalities, including a time-of-flight sensor, LiDAR, radar, or the like.

At operation 508, the process 500 can include controlling an autonomous vehicle to follow the trajectory. In some instances, the operation 508 can include generating commands that can be relayed to a controller onboard an autonomous vehicle to control the autonomous vehicle to drive the travel path. Although discussed in the context of an autonomous vehicle, the process 500, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example vehicle includes: a time-of-flight sensor configured to generate sensor data based on light received at a receiver of the time-of-flight sensor; one or more processors; and memory storing processor-executable instructions that, when executed by the one or more processors, configure the vehicle to perform actions comprising: receiving the sensor data, the sensor data comprising an intensity image including intensity information for a plurality of intensity pixels and a depth image including depth information for a plurality of depth pixels, the plurality of intensity pixels including an intensity pixel corresponding to a depth pixel of the plurality of depth pixels; determining, based at least in part on at least one of the depth information or the intensity information, a threshold intensity for the intensity pixel; determining, based on the intensity image, a measured intensity for the intensity pixel; and generating filtered data comprising at least a portion of the intensity information and at least a portion of the depth information, the filtered data including at least one of the measured intensity for the intensity pixel or a measured depth of the depth pixel, based at least in part on the measured intensity being greater than or equal to the threshold intensity.

B: The vehicle of example A, wherein the threshold intensity is inversely proportional to a power of the measured depth of the depth pixel.

C: The vehicle of example A or example B, wherein the threshold intensity is based at least in part on a depth variance associated with a subset of the plurality of depth pixels including the depth pixel.

D: The vehicle of any one of example A through example C, wherein the intensity threshold is based at least in part on an average intensity of a subset of the plurality of intensity pixels including the intensity pixel.

E: The vehicle of any one of example A through example D, the actions further comprising: determining, based at least in part on the filtered data, information about an object in the environment; determining a trajectory through the environment relative to the object; and controlling the vehicle to travel along the trajectory.

F: An example method includes: receiving sensor data from a sensor, the sensor data comprising an intensity image comprising a plurality of intensity pixels and a depth image comprising a plurality of depth pixels, an intensity pixel of the plurality of intensity pixels corresponding to a depth pixel of the plurality of depth pixels; determining, for the intensity pixel, a threshold intensity based, at least in part, on at least one of a measured depth of the depth pixel or a measured intensity of the intensity pixel; determining that a measured intensity for the pixel is below the threshold intensity; and excluding, based on the measured intensity being below the threshold intensity, the measured depth and the measured intensity from filtered data associated with the sensor data.

G: The method of example F, wherein the intensity pixel is a first intensity pixel and the depth pixel is a first depth pixel, the method further comprising: determining, for a second intensity pixel of the plurality of intensity pixels, a second threshold intensity, the second threshold intensity being based, at last in part, on at least one of a second measured depth of a second depth pixel or a second measured intensity of the second intensity pixel; determining that a second measured intensity of the second pixel meets or exceeds the second threshold intensity; and including, based on the second measured intensity meeting or exceeding the second threshold intensity, the second measured depth and the second measured intensity in the filtered data.

H: The method of example F or example G, further comprising: sending the filtered data to a vehicle control system, the vehicle control system being configured to determine a trajectory of a vehicle based at least in part on the filtered data.

I: The method of any one of example F through example H, wherein the threshold intensity is inversely proportional to a power of the measured depth.

J: The method of any one of example F through example I, further comprising: determining a depth variance associated with a subset of the plurality of depth pixels, the subset of the plurality of depth pixels comprising the depth pixel and at least one adjacent depth pixel adjacent to the depth pixel, wherein the threshold intensity is based at least in part on the depth variance.

K: The method of any one of example F through example J, wherein the threshold intensity is directly proportional to a power of the depth variance.

L: The method of any one of example F through example K, further comprising: determining an average intensity associated with a subset of the plurality of intensity pixels, the subset of the plurality of intensity pixels comprising the intensity pixel and at least one adjacent intensity pixel adjacent to the intensity pixel; wherein the threshold intensity is based at least in part on the average intensity.

M: The method of any one of example F through example L, wherein the threshold intensity is directly proportional to a power of the average intensity.

N: The method of any one of example F through example M, further comprising: determining an intensity histogram associated with the measured data; determining, based at least in part on the intensity histogram, at least one band of intensities above a threshold energy; determining a second intensity threshold based at least in part on a number of intensity pixels in the at least one band; and filtering the intensity pixels based at least in part on the second intensity threshold.

O: An example system includes: one or more processors; and computer-readable storage media storing instructions executable by the one or more processors to perform operations comprising: receiving sensor data from a sensor, the sensor data comprising a plurality of intensity pixels having measured intensities and a plurality of depth pixels having measured depths, an intensity pixel of the plurality of intensity pixels corresponding to a depth pixel of the plurality of depth pixels; determining, for the intensity pixel, a threshold intensity, the threshold intensity being based, at least in part, on at least one of a measured intensity of the intensity pixel or a measured depth of the depth pixel; comparing the measured intensity of the intensity pixel to the threshold intensity; and generating filtered data comprising at least a portion of the intensity information and at least a portion of the depth information, the filtered data including at least one of intensity information associated with the intensity pixel or depth information associated with the depth pixel based at least in part on the measured intensity being greater than or equal to the threshold intensity.

P: The system of example O, wherein the threshold intensity is inversely proportional to a power of the measured depth.

Q: The system of example O or example P, the operations further comprising: determining a depth variance associated with a first subset of the plurality of depth pixels, the subset of the plurality of depth pixels comprising the depth pixel and at least one adjacent depth pixel adjacent to the depth pixel, wherein the threshold intensity is based at least in part on the depth variance.

R: The system of any one of example O through example Q, the operations further comprising: determining an average intensity associated with a second subset of the plurality of intensity pixels, the second subset of the plurality of intensity pixels comprising the intensity pixel and at least one adjacent intensity pixel adjacent to the intensity pixel; wherein the threshold intensity is based at least in part on the average intensity.

S: The system of any one of example O through example R, wherein the first subset comprises a first number of depth pixels and the second subset comprises a second number of intensity pixels different from the first number.

T: The system of any one of example O through example S, wherein the first number is smaller than the second number.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:
a time-of-flight sensor configured to generate sensor data based on light received at a receiver of the time-of-flight sensor;
one or more processors; and
memory storing processor-executable instructions that, when executed by the one or more processors, configure the vehicle to perform actions comprising:
receiving the sensor data, the sensor data comprising an intensity image including intensity information for a plurality of intensity pixels and a depth image including depth information for a plurality of depth pixels, the plurality of intensity pixels including an intensity pixel corresponding to a depth pixel of the plurality of depth pixels;
determining, based at least in part on at least one of the depth information or the intensity information, a threshold intensity for the intensity pixel;
determining, based on the intensity image, a measured intensity for the intensity pixel;
generating filtered data comprising at least a portion of the intensity information and at least a portion of the depth information, the filtered data including at least one of the measured intensity for the intensity pixel or a measured depth of the depth pixel, based at least in part on the measured intensity being greater than or equal to the threshold intensity;
determining a trajectory for the vehicle based at least in part on the filtered data; and
controlling the vehicle according to the trajectory.

2. The vehicle of claim 1, wherein the threshold intensity is inversely proportional to a power of the measured depth of the depth pixel.

3. The vehicle of claim 2, wherein the threshold intensity is based at least in part on a depth variance associated with a subset of the plurality of depth pixels including the depth pixel.

4. The vehicle of claim 2, wherein the intensity threshold is based at least in part on an average intensity of a subset of the plurality of intensity pixels including the intensity pixel.

5. The vehicle of claim 1, the actions further comprising:
determining, based at least in part on the filtered data, information about an object in the environment,
wherein the determining the trajectory comprises determining a trajectory relative to the object.

6. A method comprising:
receiving sensor data from a sensor, the sensor data comprising an intensity image comprising a plurality of intensity pixels and a depth image comprising a plurality of depth pixels, an intensity pixel of the plurality of intensity pixels corresponding to a depth pixel of the plurality of depth pixels;
determining, for the intensity pixel, a threshold intensity based, at least in part, on at least one of a measured depth of the depth pixel or a measured intensity of the intensity pixel;
determining that a measured intensity for the pixel is below the threshold intensity; and
excluding, based on the measured intensity being below the threshold intensity, the measured depth and the measured intensity from filtered data associated with the sensor data.

7. The method of claim 6, wherein the intensity pixel is a first intensity pixel and the depth pixel is a first depth pixel, the method further comprising:
determining, for a second intensity pixel of the plurality of intensity pixels, a second threshold intensity, the second threshold intensity being based, at last in part, on at least one of a second measured depth of a second depth pixel or a second measured intensity of the second intensity pixel;
determining that a second measured intensity of the second pixel meets or exceeds the second threshold intensity; and
including, based on the second measured intensity meeting or exceeding the second threshold intensity, the second measured depth and the second measured intensity in the filtered data.

8. The method of claim 7, further comprising:
sending the filtered data to a vehicle control system, the vehicle control system being configured to determine a trajectory of a vehicle based at least in part on the filtered data.

9. The method of claim 6, wherein the threshold intensity is inversely proportional to a power of the measured depth.

10. The method of claim 6, further comprising:
determining a depth variance associated with a subset of the plurality of depth pixels, the subset of the plurality of depth pixels comprising the depth pixel and at least one adjacent depth pixel adjacent to the depth pixel,
wherein the threshold intensity is based at least in part on the depth variance.

11. The method of claim 10, wherein the threshold intensity is directly proportional to a power of the depth variance.

12. The method of claim 10, further comprising:
determining an average intensity associated with a subset of the plurality of intensity pixels, the subset of the plurality of intensity pixels comprising the intensity pixel and at least one adjacent intensity pixel adjacent to the intensity pixel;
wherein the threshold intensity is based at least in part on the average intensity.

13. The method of claim 12, wherein the threshold intensity is directly proportional to a power of the average intensity.

14. The method of claim 6, further comprising:
determining an intensity histogram associated with the measured data;
determining, based at least in part on the intensity histogram, at least one band of intensities above a threshold energy;
determining a second intensity threshold based at least in part on a number of intensity pixels in the at least one band; and
filtering the intensity pixels based at least in part on the second intensity threshold.

15. A system comprising:
one or more processors; and
computer-readable storage media storing instructions executable by the one or more processors to perform operations comprising:
receiving sensor data from a sensor, the sensor data comprising a plurality of intensity pixels having measured intensities and a plurality of depth pixels having measured depths, an intensity pixel of the plurality of intensity pixels corresponding to a depth pixel of the plurality of depth pixels;
determining, for the intensity pixel, a threshold intensity, the threshold intensity being based, at least in part, on at least one of a measured intensity of the intensity pixel or a measured depth of the depth pixel;
comparing the measured intensity of the intensity pixel to the threshold intensity; and
generating filtered data comprising at least a portion of the intensity information and at least a portion of the depth information, the filtered data including at least one of the measured intensity or the measured depth based at least in part on the measured intensity being greater than or equal to the threshold intensity.

16. The system of claim 15, wherein the threshold intensity is inversely proportional to a power of the measured depth.

17. The system of claim 15, the operations further comprising:
determining a depth variance associated with a first subset of the plurality of depth pixels, the subset of the plurality of depth pixels comprising the depth pixel and at least one adjacent depth pixel adjacent to the depth pixel,
wherein the threshold intensity is based at least in part on the depth variance.

18. The system of claim 17, the operations further comprising:
determining an average intensity associated with a second subset of the plurality of intensity pixels, the second subset of the plurality of intensity pixels comprising the intensity pixel and at least one adjacent intensity pixel adjacent to the intensity pixel;
wherein the threshold intensity is based at least in part on the average intensity.

19. The system of claim 18, wherein the first subset comprises a first number of depth pixels and the second subset comprises a second number of intensity pixels different from the first number.

20. The system of claim 19, wherein the first number is smaller than the second number.

* * * * *